United States Patent
Waugh et al.

(10) Patent No.: US 8,520,840 B2
(45) Date of Patent: Aug. 27, 2013

(54) SYSTEM, METHOD AND COMPUTER PRODUCT FOR PKI (PUBLIC KEY INFRASTRUCTURE) ENABLED DATA TRANSACTIONS IN WIRELESS DEVICES CONNECTED TO THE INTERNET

(75) Inventors: Donald C. Waugh, Oakville (CA); Michael A. Roberts, Thornhill (CA); Rahim Alibhai, North York (CA); Qinsheng Lai, Toronto (CA)

(73) Assignee: Echoworx Corporation

( * ) Notice: Subject to any disclaimer, the term of this patent is extended or adjusted under 35 U.S.C. 154(b) by 830 days.

(21) Appl. No.: 10/178,224

(22) Filed: Jun. 25, 2002

(65) Prior Publication Data

US 2003/0046362 A1    Mar. 6, 2003

Related U.S. Application Data

(60) Provisional application No. 60/300,053, filed on Jun. 25, 2001.

(30) Foreign Application Priority Data

Jun. 13, 2001    (CA) .................................... 2350321

(51) Int. Cl.
  *H04K 1/00*    (2006.01)
  *H04L 9/08*    (2006.01)
(52) U.S. Cl.
  USPC ............................................. 380/30; 380/282
(58) Field of Classification Search
  USPC ............... 713/170, 171, 150, 151, 160, 161, 713/167–168, 162–163; 380/277, 30, 278–285
  See application file for complete search history.

(56) References Cited

U.S. PATENT DOCUMENTS 5,862,325 A * 1/1999 Reed et al. ..................... 709/201
5,892,904 A * 4/1999 Atkinson et al. ................ 726/22

(Continued)

FOREIGN PATENT DOCUMENTS

WO    WO 00/31944    6/2000
WO    WO 01/37496    5/2001

OTHER PUBLICATIONS

Federal InformationProcessing Standards Publication 46-2, U.S. Department of Commerce / National Institute of Standards and Technology, Data Encryption Standard (DES), Dec. 30, 1993.*

(Continued)

*Primary Examiner* — Chirag R Patel
(74) *Attorney, Agent, or Firm* — Christopher D. Heer; Bennett Jones LLP

(57) ABSTRACT

A system, computer product and method is provided for PKI enabled data communication at a browser. A PKI enabled browser is loaded one or more network-connected device. The PKI enabled browser requests a web page from a web server. The web page is downloaded to the PKI enabled browser. The PKI enabled browser includes a PKI operation module which conducts one or more PKI operations corresponding to the particular web page downloaded. These operations may include encrypting data, decrypting data, authenticating data, or verifying digital signatures. The invention permits PKI enabled posting of data to a remote computer, including from a wireless device, as well as PKI enabled retrieval of data at a computer from a remote computer, including at a wireless device. The PKI enabled browser of the invention is supported by a web server that includes a web application that facilitates PKI enabled data transactions at the PKI enabled browser. The inventions supports persistent PKI enablement, as well as field level encryption of data throughout the PKI transaction.

15 Claims, 7 Drawing Sheets

(56) References Cited

U.S. PATENT DOCUMENTS

| | | | |
|---|---|---|---|
| 5,903,652 A * | 5/1999 | Mital | 705/78 |
| 6,105,012 A * | 8/2000 | Chang et al. | 705/64 |
| 6,353,886 B1 * | 3/2002 | Howard et al. | 713/156 |
| 6,678,821 B1 * | 1/2004 | Waugh et al. | 713/168 |
| 6,834,112 B1 * | 12/2004 | Brickell | 380/279 |
| 6,941,459 B1 * | 9/2005 | Hind et al. | 713/167 |
| 7,290,285 B2 * | 10/2007 | McCurdy et al. | 726/27 |
| 7,350,071 B1 * | 3/2008 | Reisman | 713/151 |
| 2003/0055962 A1 | 3/2003 | Freund et al. | |
| 2003/0105825 A1 | 6/2003 | Kring et al. | |
| 2003/0167402 A1 | 9/2003 | Stolfo et al. | |
| 2003/0177389 A1 | 9/2003 | Albert et al. | |

OTHER PUBLICATIONS

Dartmouth Computing, Dartmouth College PKI Lab, Using PKI, http://www.dartmouth.edu/~pkilab/pages/Using_PKI.html.*

Extended Validation SSL Certificate, The Next Generation High Assurance SSL Certificate, Using SSL, "htpp://www.evsslcertificate.com/ssl/description-sss.html".*

Extended Validation SSL Certificate, The Next Generation High Assurance SSL Certificate, http://22.evsslcertificate.com/ssl/description-ssl.html.*

* cited by examiner

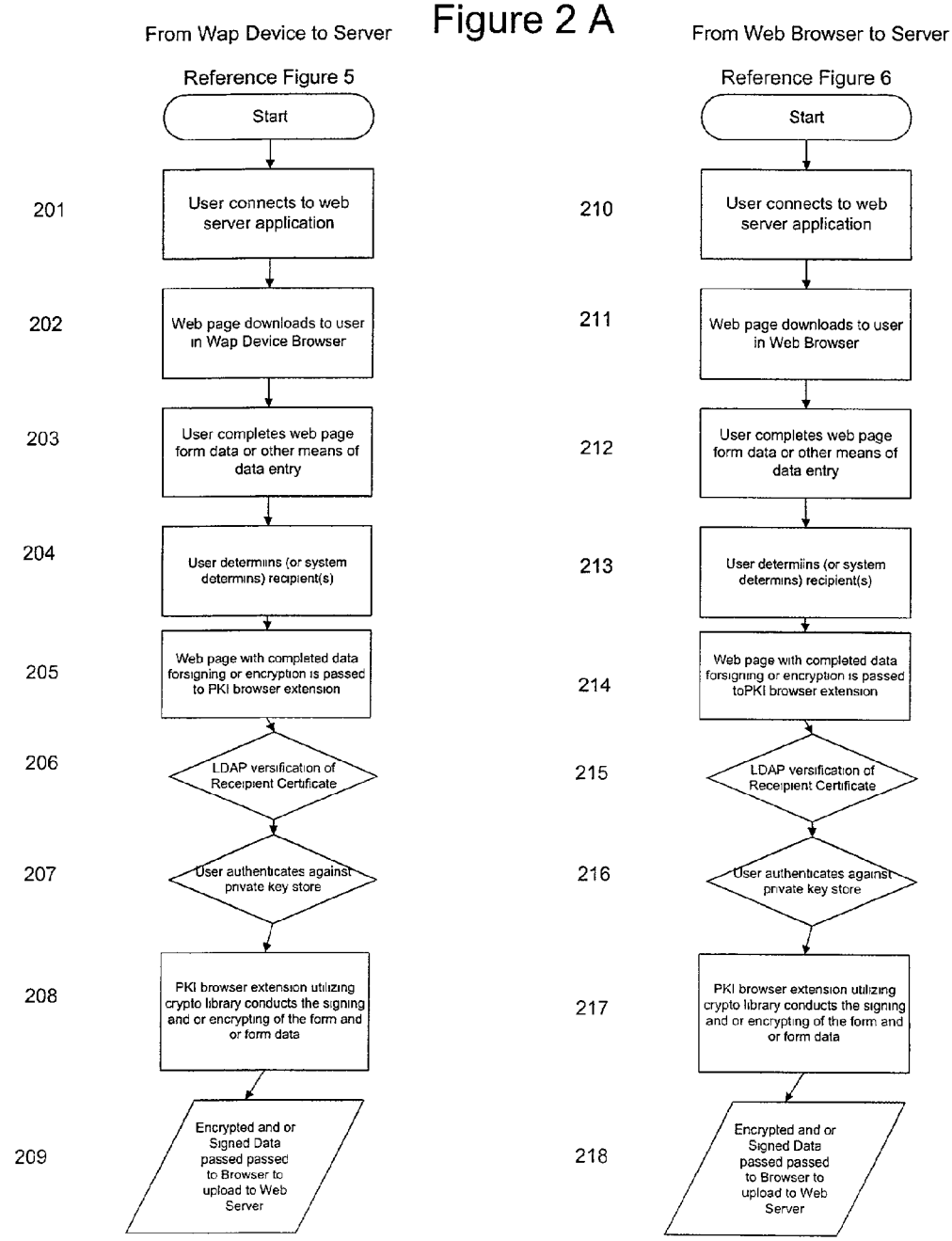

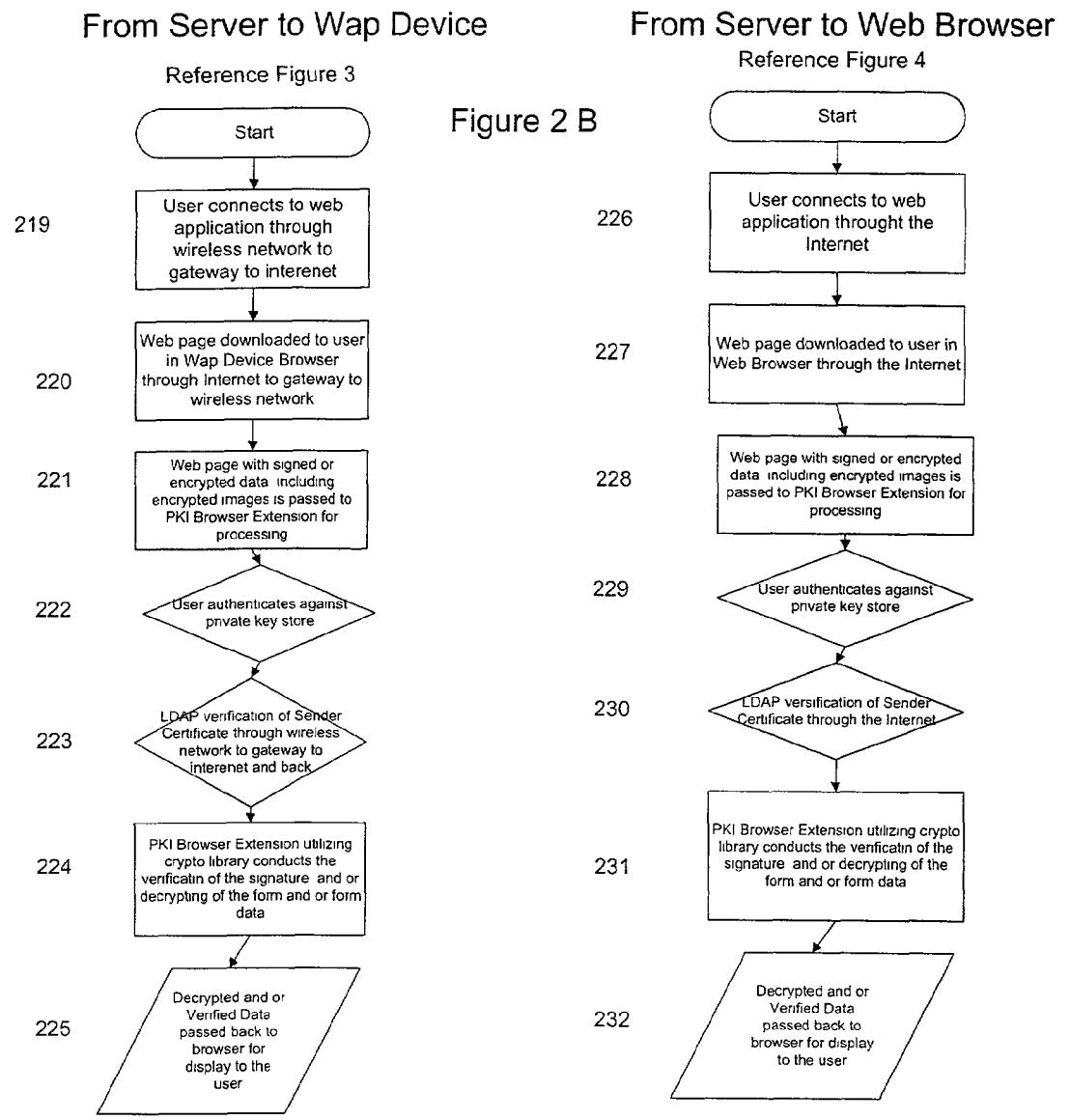

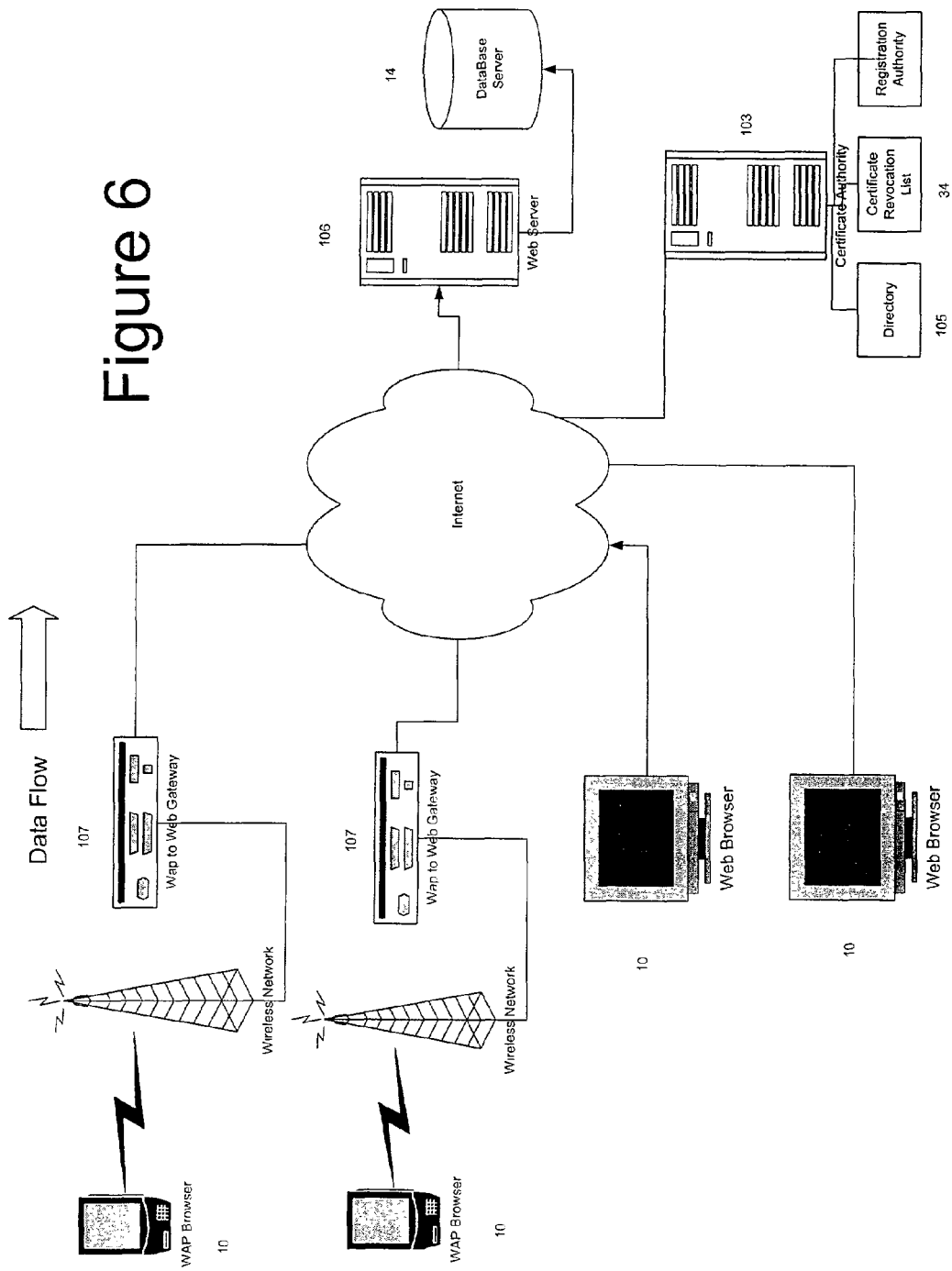

SYSTEM, METHOD AND COMPUTER PRODUCT FOR PKI (PUBLIC KEY INFRASTRUCTURE) ENABLED DATA TRANSACTIONS IN WIRELESS DEVICES CONNECTED TO THE INTERNET

CROSS REFERENCE TO RELATED APPLICATIONS

This application claims the benefit of U.S. Provisional Application No. 60/300,053 filed Jun. 25, 2001.

FIELD OF THE INVENTION

The invention relates generally to public key infrastructure (PKI), the Internet and wireless networking. More specifically, it relates to a system, computer program and method for both submitting secure data to a web server, and retrieving secure data from a web server.

BACKGROUND OF THE INVENTION

Based on the recent explosive growth of Internet use, there has been a proliferation of web-based computer applications (web applications). Concurrent to this growth has been an expansion of the use of wireless communication networks. Much of this wireless development has been in the realm of WAP (wireless area protocol) environments which are generally separate from the Internet.

The division between the Internet and WAP environments results in increased development costs in that separate applications are generally required for both the Internet and WAP environments. Furthermore, applications are often not operable between the two environments. Web applications are advantageous to traditional computer applications in many ways, including: simplified client requirements, centralized administration, simplified software updates, and the ability to reach a larger audience of users.

Prior art solutions have shown that the use of web browsers on computers connected to a wireless network has enabled these applications to be made accessible through web servers and computer networks. For instance, there are many solutions that provide a gateway device that functions as a bridge between the WAP network and the Internet. These solutions usually employ a scaled down version of a browser ("mini browser") in a wireless device (cellular phones, personal digital assistant etc.) capable of accessing and retrieving "web pages" developed for the web. These mini browsers operate in tandem with a proxy server or gateway which translates WAP requests to Internet protocol formats and thereby returning, answers to such requests back to the wireless device, in a manner that is well known. Generally, in known applications of such proxy servers, images and other large data sets are stripped from web pages accessible via the Internet, such that the request will be transmitted relatively quickly to the wireless device and the data can be viewed in the display space of the wireless device that is generally restricted as compared to the colour monitor of a laptop, for example.

The value of privacy and security of data is of growing concern, particularly with the implementation of e-commerce applications. Currently, there are three main technologies that protect data traffic. The most popular is SSL, or the secure socket layer, where the server that hosts the Internet application establishes a secure connection with the browser connected to it. The other technologies are VPN (virtual private network technologies) and IPSEC (Internet protocol security), which are based on derivatives of various cryptographic techniques. These technologies are advantageous in their simplicity of use and deployment.

There are also certain disadvantages associated with the use of such data protection technologies. SSL, for example, operates in a wired network environment only. While VPN provides data security in a wireless network as well as a wired network, systems, computer products and methods for data security in a wireless environment are generally such that data arrives at a wireless device on an unencrypted basis. Unfortunately, this requires the user of the wireless device to rely on the security and data integrity of the system from which the data is forwarded, whether this is based on proprietary wireless security standards or VPN or IPSEC. This also means that data stored on, for instance, a computer network can, notwithstanding the security technology employed during transmission, be stolen by hacking or other means.

Prior art systems, computer products and methods for providing communication of data to a wireless device described above generally fail to provide means for authenticating the sender of such data, for example, by means of digital signatures, as opposed to mere encryption of the data.

In contrast to such prior art data security systems, computer products and methods described above, a further system, computer product or method based on the well known PKI provides means for delivering data on an encrypted basis, as well as the authentication of the sender of such data. With the PKI method of preserving the confidentiality of a message, both the sender and the recipient of the data have a pair of keys, one being a private key and the other being a public key. The encryption method is asymmetric in that if a user's public key was used to encrypt the message, decryption can only occur with a user's private key.

PKI is especially useful in applications where the authentication of documents is expected to conform with certain industry standards, such as with the legal acceptance of electronic documents.

However, PKI has been difficult to implement in wireless applications, This is because the deployment of PKI in a wireless environment has generally required costly custom development of wireless PKI applications.

Therefore there is a need for a system, computer product and method that allows the deployment of PKI in a wireless environment that is relatively easy to use and inexpensive to deploy across a wide array of web applications having varying functionality.

Another disadvantage of prior art PKI solutions is the need for the use of a remote gateway to perform the function of authentication of the sender. Thus, there is a need for deploying PKI in a wireless environment wherein authorization occurs at a wireless device without need for such a third party gateway.

SUMMARY OF THE INVENTION

In a first aspect of the present invention, a method is provided whereby a user submits data on a secure basis to a web server, using PKI. In a second aspect of the present invention, a corresponding method is provided whereby data is received from a web server by a user on a secure basis, using PKI. In accordance with each such PKI enabled method of the present invention, data is generally protected at three places: at the user source of creation, in transmission, and at the recipient destination. The user secures the data through the use of a wireless device browser which transmits web forms to be completed and encrypted by a "PKI browser" and, in addition in some implementations of the present invention, signed.

Once encrypted and/or signed and the data is secured, the PKI enabled data is then delivered from the wireless browser to the web server, or from the wired web browser to the server, where it will remain until it is requested by the recipient.

The recipient may request PKI enabled data from either a wireless browser or from a wired web browser by requesting a message from the web server, which is delivered to the browser and then triggers a PKI browser extension to authenticate the certificate and authorize the decryption of the data, and in addition in some implementation of the present invention, verify the signature. This data is no longer PKI enabled and is ready to be viewed by the recipient.

In a third aspect of the present invention, a computer application is provided for use at a network-connected device, for submitting PKI enabled data on a secure basis to a web server, and receiving PKI enabled data on a secure basis from a web server.

In a fourth aspect of the present invention, a web server application is provided for use on a web server for facilitating the receipt of PKI enabled data on a secure basis from a network-connected device, and for sending PKI enabled data on a secure basis to one or more network-connected devices In a fifth aspect of the present invention, a system is provided for providing PKI enabled data transactions between a first computer and a second remote computer connected to the first computer.

BRIEF DESCRIPTION OF THE DRAWINGS

A detailed description of the preferred embodiment(s) is(are) provided herein below by way of example only and with reference to the following drawings, in which:

FIG. 2A is a flow chart which illustrates the two stages involved in posting PKI enabled data in accordance with the present invention: a) from a WAP device to the Server, and b) from the Web browser to the Server.

FIG. 2B is a flow chart which illustrates the two stages involved in retrieving posted PKI enabled data in accordance with the present invention: a) from the Server to the WAP device, and b) from the Server to the Web browser.

FIG. 6 is a schematic diagram illustrating the flow of PKI enabled data from a wired Web browser to a Web server.

Figure 1:
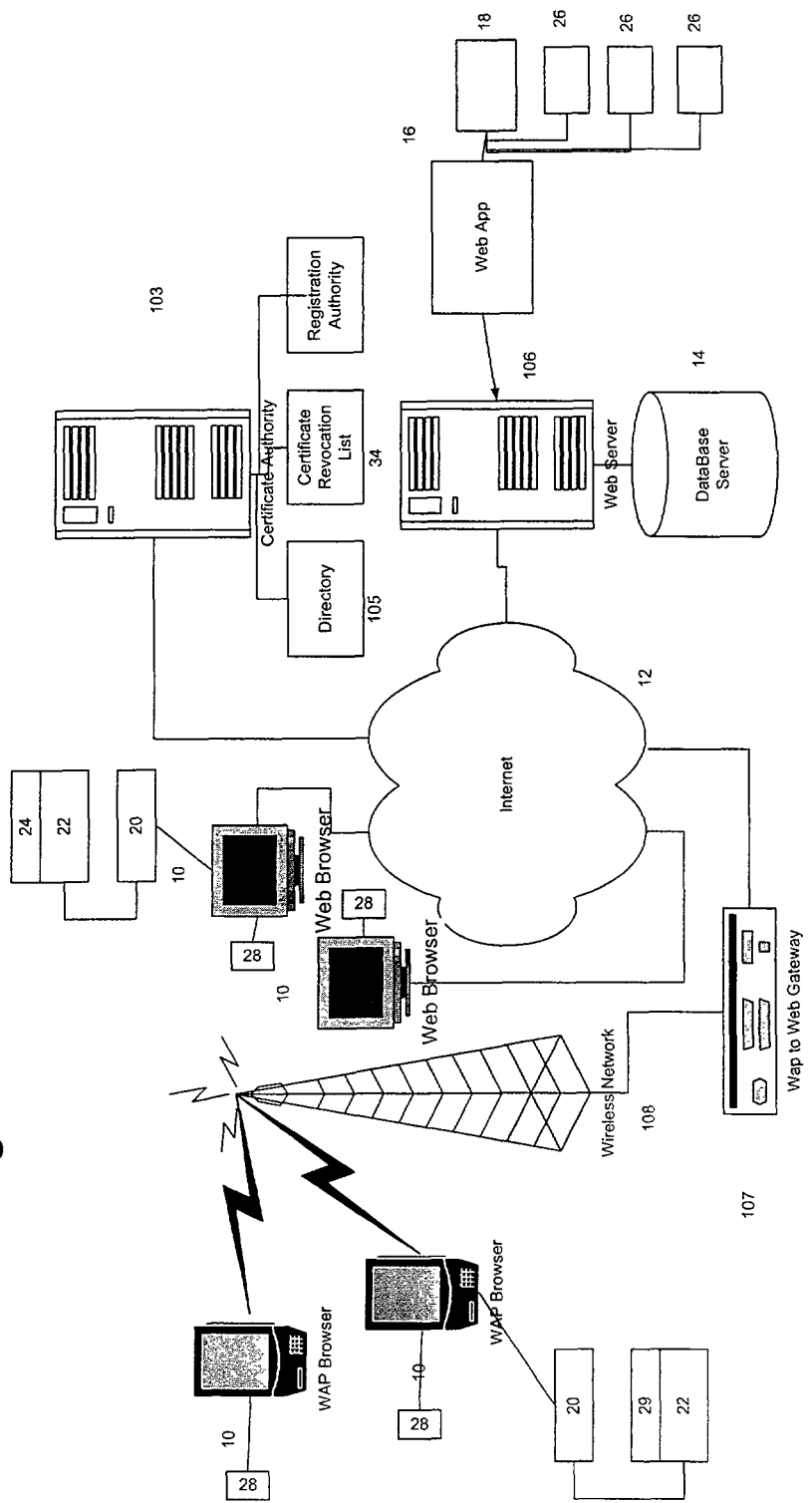
FIG. 1 is a schematic System Resource Chart which illustrates the overall system for deploying PKI enablement of data in relation to a wireless network.
Figure 3:
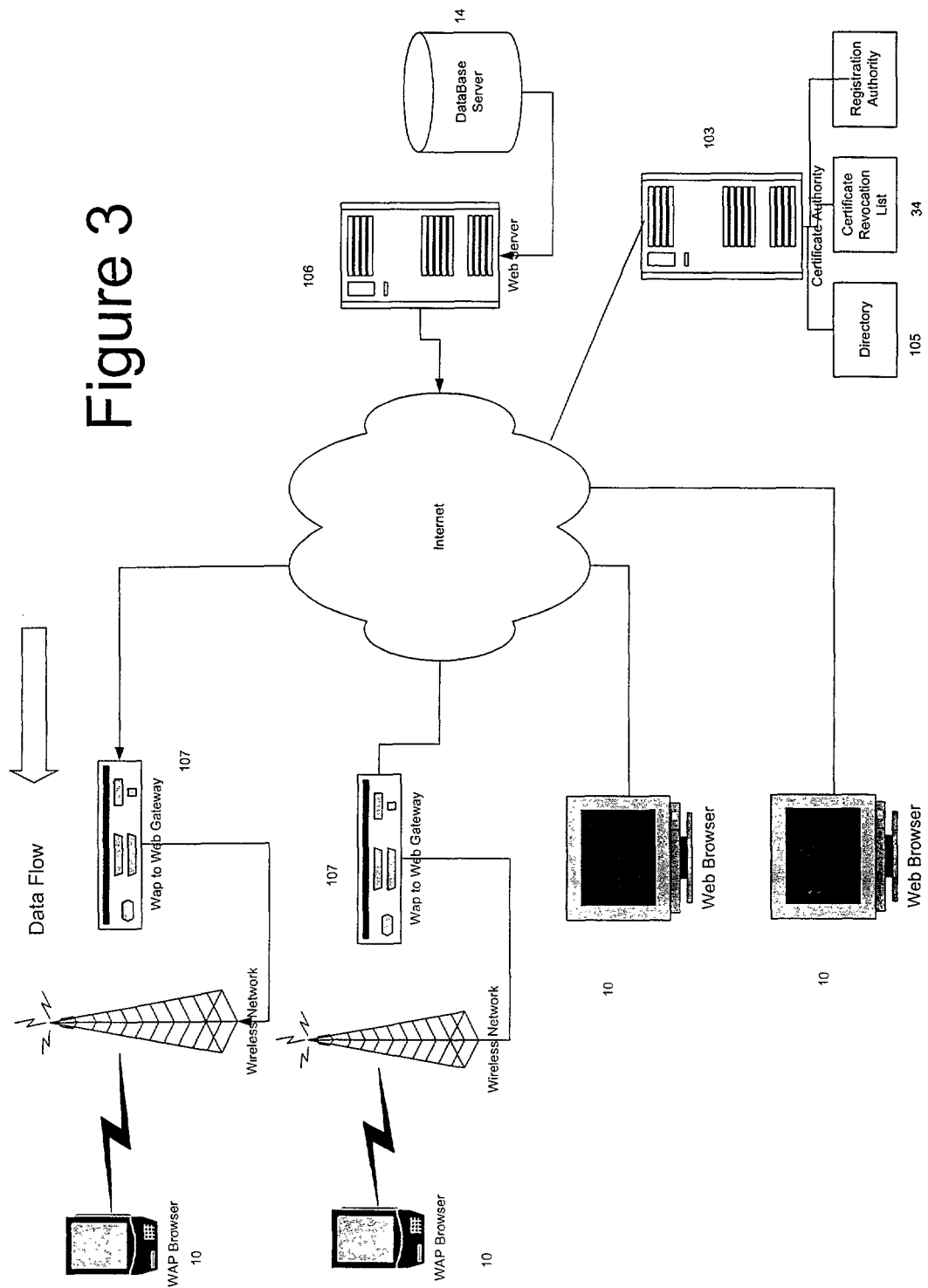
FIG. 3 is a schematic diagram illustrating the flow of PKI enabled data from the Server to a wireless device.
Figure 4:
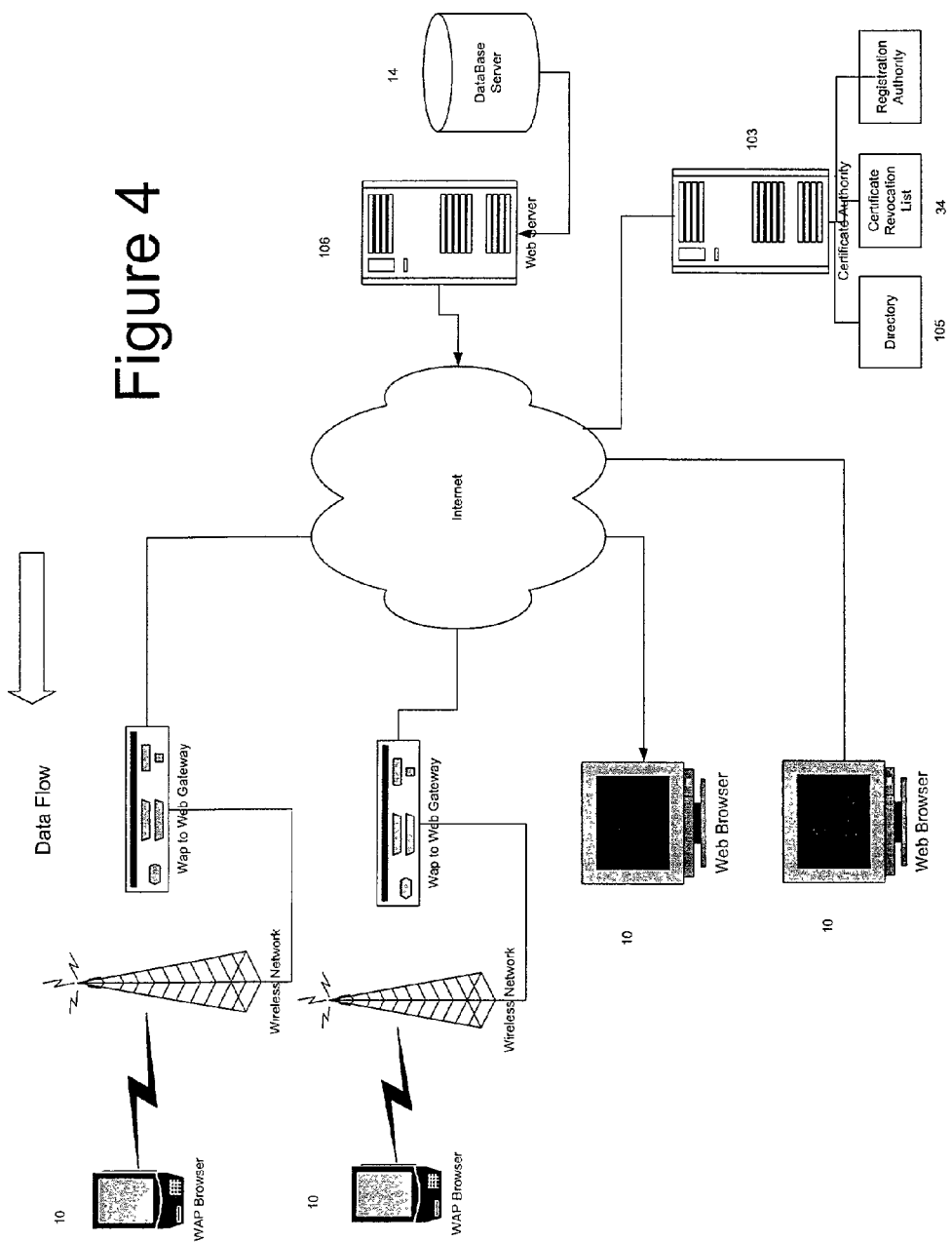
FIG. 4 is a schematic diagram illustrating the flow of PKI enabled data from the Server to a Web browser.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENTS

As illustrated in FIG. 1, at least one known network-connected device 10 is provided. Network-connected devices 10 may include a number of digital devices that provide connectivity to a network of computers. For example, network-connected device 10 may include a known WAP device, cell phone, PDA or the like.

The network-connected device 10 is connected to the Internet in a manner that is known. Specifically in relation to FIG. 1, the connection of a network-connected device 10 that is a known WAP device to the Internet is illustrated, whereby a known WAP to WEB gateway 107 is provided, in a manner that is also known.

Also connected to the Internet 12, is a web server 106 which is provided using known hardware and software utilities so as to enable provisioning of the network-connected device 10, in a manner that is known. Web server 106 is connected to a database 14 in a manner that is known, including for storing data received from network-connected devices 10. Web server 106 also includes a web application 16. The web application 106 provides a number of functions. First, the web application 106 provides a web page 18 accessible via the Internet 12. Second, the web application 106 is adapted to provision the network-connected devices 10. The provisioning contemplated by the present invention may include any manner of data transactions such as e-commerce transactions, on-line prescriptions, secure messaging, transfer of patient files, data transaction involving sensitive corporate information, or sensitive government information, etc. Third, the web application 106 is adapted to execute the PKI operations referenced below.

Each of the network-connected devices 10 also includes a browser 20. The browser can be a standard Internet based browser, such as Netscape's Navigator™ or Microsoft's Internet Explorer™ or a known mini browser for wireless products such as cell phones or PDAs.

Each of the network-connected devices 10 also includes the application 22 of the present invention. In one particular embodiment of the present invention, application 22 is best understood as a browser extension or plug-in that is provided in a manner that is known. Specifically, the application 22 and the browser 20 inter-operate by means of, for example, customized HTML tags.

It should also be understood, however, that the resources of the application 22 could also be provided by integration of the features of the application 22 in a browser or mini-browser, as opposed to a standalone application.

Application 22 preferably provides necessary resources, as particularized below, to function with any third party PKI system, including for example, ENTRUST™, MICROSOFT™, BALTIMORE™, RSA™ and so forth.

Application 22 includes a cryptographic utility 24, provided in a manner that is known, that is adapted to perform at network-connected device 10 a series of cryptographic operations, including but not limited to:

Digital signature of data in form fields;
Encryption of data in form fields;
Decryption of data in form fields;
Verification of signature of data in form fields;
Digital signature and encryption of data in form fields;
Verification of Digital signature and decryption of data in form fields;
Digital signature of full pages;
Verification of digital signature of full pages; and
Encryption of full pages.

The system of the present invention is best understood as an overall system for providing PKI enabled data transactions between one or more network-connected devices 10 and a web server 106. Another aspect of the present invention is the system provided by each of the network connected devices 10 including the application 22 of the present invention, for PKI enabled data transactions with the web server 106. Yet another aspect of the present invention is a system provided by the web server 106 including the web application 16, for PKI enabled data transactions with the network-connected devices 10.

It should be understood from the above that an important advantage of the present invention is that it permits a wide range of PKI operations, including at a wireless device, which permits flexible PKI enablement of a wide variety of data transactions.

Posting Data on a Secure Basis

Figure 5:
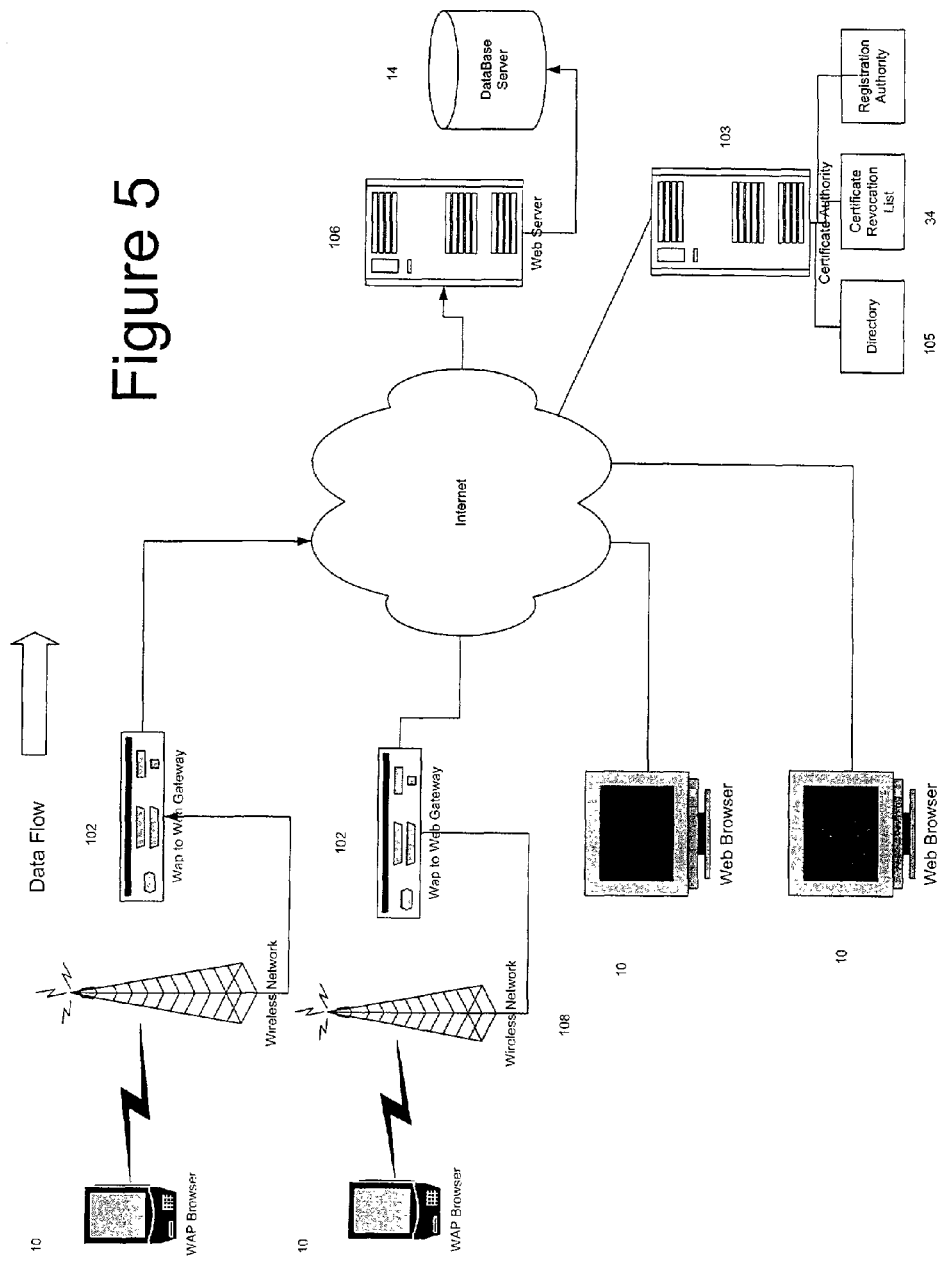
FIG. 5 is a schematic diagram illustrating the flow of PKI enabled data from a wireless device browser to a Web server.

FIG. 2A and FIGS. 5 and 6 illustrate the operation of the present invention in relation to PKI enabled data transactions as between a network-connected device 10, namely a WAP device or Web browser, on the one hand, and web server 106 on the other.

User, on a network-connected device 10, requests web page 18 from the web server 106 by connecting to web server application 16. Web application 16 presents a specific web page 18 responsive to the request from the network-connected device 10. The web page 18 is downloaded to the User through network-connected device 10. Specifically in relation to a network-connected device 10 that is a WAP device, web page 18 is downloaded to the WAP device's browser through the WAP to Web gateway 107 as illustrated in FIG. 1, in a manner that is known. WAP to Web gateway 107 functions as a translator in that it converts wireless device requests to web protocol (HTTP) requests. This translation enables User on the WAP device to access the web page 18 via the wireless network 108, again as illustrated in FIG. 1.

It should be understood, that the present invention also contemplates PKI enabled data communications with other users associated with other network connected devices 10. One or more of these other network-connected devices 10 may be a typical personal computer having a known web browser, and connected to the Internet 12 in a manner that is known, as also illustrated in FIG. 1.

In one particular embodiment of the present invention, web page 18 includes a web form 26 in a known format preferably including a plurality of fields. The present invention contemplates a series of web forms 26, each being identified by a "SUBJECT" or equivalent, depending on the function of the web form 26, as explained below. In one particular embodiment of the web form 26 of the present invention, web form 26 comprises mark-up language representing the required input from User, and instructions for cryptographic utility 24 to conduct certain specific cryptographic operations for the particular web form 26, as described below. One aspect of a particular embodiment of the present invention is that certain of these instructions, and resultant cryptographic operations, may apply to specific fields included in the web form 26.

The web form 26 is also provided, in a manner that is known, with triggers or instructions that are received by web application 16 for executing functions using the data provided by User to the web form 26, as also particularized below. Again, these triggers or instructions may result in operations by web application 16 involving data contained in particular fields of web form 26. These operations effectively permits PKI enabled Internet provisioning in accordance with the present invention.

User provides the data requested by web form 26 and then either the application 22 or the User will determine the location of the Recipient of this data. It should be understood that in some implementations of the present invention, the Recipient will be web server 106. In other implementations of the present invention, the Recipient will be one or more remote network-connected devices 10, also including the application 22 of the present invention. Or the Recipient may be both one or more remote network-connected devices 10 and web server 106. User and Recipient may also be individuals, for example, a doctor communicating with a patient for the purposes of secure on-line approval of a prescription.

In either case, the User submits the web form 26, typically by clicking on a "SUBMIT" button or equivalent, for sending the contents thereof to the Recipient. The cryptographic utility 24 is responsive to this action to perform a number of functions which are described below. It should be understood that the steps or functions described below could be combined into a lesser number of steps or functions, or expanded to a greater number of steps or functions, without departing from the scope of the present invention.

Cryptographic utility 24 gathers from the memory 28 certain cryptographic operation parameters corresponding to the "SUBJECT" of the particular web form 26, including common name, distinguished name, email address or other information of User and/or Recipient; cryptographic mode, and the specific web form 26 fields to operate on.

Cryptographic utility 24 contacts a known Certificate Authority 103 via the communication facility (not shown) provided by network-connected device 10 to obtain information required to provide PKI enabled data to web server 106. Specifically, Certificate Authority 103 controls a Directory 105 that is also connected to the Internet that functions in a manner that is known. Cryptographic utility 24 retrieves certificates for the Recipient from Directory 105 associated with Certificate Authority 103.

Cryptographic utility 24 also interfaces with a known Certificate Revocation List 34, also associated with the Certificate Authority 103, to validate the Recipient's certificate, check for expiration, check for revocation, and also to obtain key usage data to permit use of the Recipient's certificate to conduct a PKI process.

Cryptographic utility 24 authenticates the User for PKI transaction, including for the purpose of preparing for use of the User's private key for digitally signing data included in web form 26 (as explained below).

Cryptographic utility 24 then conducts a series of cryptographic operations which generally include signing data included in web form 26 and/or encryption thereof. It should be understood that in the present invention, cryptographic utility 24 is adapted to perform specific cryptographic operations in relation to specific fields of web form 26 because they are marked for processing by the coding included in web form 26. For example, a particular web form 26 may call for each specified data element to be encoded in PKCS#7 format, or using some other custom data format involving digitally signing and/or encrypting. Data in other fields may remain unmodified.

This permits fields with sensitive data, for example, to be processed on an encrypted and/or digitally signed basis, while other fields with less sensitive data may remain unencrypted and unsigned. This conserves bandwidth, as well as memory resources wherever the data included in the web form 26 may be received. This also allows flexibility in terms of data management in that less sensitive data can be "mined" while protecting sensitive data.

Cryptographic utility 24 then builds a Web compliant "POST" data structure in a manner that is known (HTTP 1.1 for example), comprising for example a field name and clear or cipher text value pairs. This "POST" data structure is then sent to the web server 106. Web application 16 is then adapted to process the data in web form 26 in a manner that is known, in accordance with the particular processes associated with a particular "SUBJECT" defined web form 26. This may involve confirming digital signatures associated with particular fields, decrypting and processing data in particular fields.

One important aspect of a particular embodiment of the present invention is that the web application 16 in accordance with the present invention is adapted to store data in particular fields in an encrypted format to database 14. This improves the security that the present invention provides overall in that third parties cannot obtain data sent in accordance with the present invention, even by hacking into web server or database 14.

Retrieving Data on a Secure Basis

In another aspect of the present invention, retrieval of data stored in database 14 at one or more network-connected devices 10 is provided on a PKI enabled basis.

It should be understood that the steps or functions described below could be combined into a lesser number of steps or functions, or expanded to a greater number of steps or functions, without departing from the scope of the present invention.

Generally the retrieval of data on a secure basis in accordance with the present invention will involve a Recipient of the data, but also a Sender of the data.

Recipient, on a network-connected device 10, requests web page 18 from the web server 106 by connecting to web server application 16. Web application 16 presents a specific web page 18 responsive to the request from the network-connected device 10. The web page 18 is downloaded to the user through network-connected device 10. As stated earlier, specifically in relation to a network-connected device 10 that is a WAP device, web page 18 is downloaded to the WAP device's browser through the WAP to Web gateway 107 as illustrated in FIG. 1, in a manner that is known. WAP to Web gateway 107 functions as a translator in that it converts wireless device requests to web protocol (HTTP) requests. This translation enables user on the WAP device to access the web page 18 via the wireless network 108, again as illustrated in FIG. 1.

It should be understood, that the present invention also contemplates PKI enabled data communications with other users associated with other network connected devices 10. One or more of these other network-connected devices 10 may be a typical personal computer having a known web browser, and connected to the Internet 12 in a manner that is known, as also illustrated in FIG. 1.

The present invention contemplates that secure data from web server 106 will come in numerous different forms, depending on the precise nature of the implementation of the present invention. Each such particular form will also generally be identified by a "SUBJECT" or equivalent, depending on the use of the data received at the particular network-connected device 10.

In one particular embodiment of the web page 18 containing secure data, the web page 18 also comprises mark-up language representing the output, and instructions for cryptographic utility 24 to conduct certain specific cryptographic operations in relation to the web page 18, as described below. One aspect of a particular embodiment of the present invention is that certain of these instructions, and resultant cryptographic operations, may apply to specific data included in web page 18.

Once the web page 18 is loaded to browser 20, the cryptographic utility 24 is engaged such that cryptographic functions described below are processed.

Cryptographic utility 24 gathers from the memory 28 certain cryptographic operation parameters corresponding to the "SUBJECT" of the particular web page 18, including common name, distinguished name, email address or other information of User and/or Recipient; cryptographic mode, and the specific web mark up tags to operate on, thereby identifying specific data in the web page 18 for cryptographic processing.

Cryptographic utility 24 contacts Certificate Authority 103 via the communication facility (not shown) provided by network-connected device 10 to obtain the PKI enabled data included in web page 18.

As mentioned earlier, Certificate Authority 103 operates a Directory 105 that is connected to the Internet. Cryptographic utility 24 retrieves certificates for the Sender and the Recipient from the Directory 105 in a manner that is known.

Cryptographic utility 24 also interfaces with a known Certificate Revocation List 34, also associated with the Certificate Authority 103, to retrieve the Certificate Revocation List 34.

Cryptographic utility 24 then authenticates the Recipient for PKI transaction, and in preparation for use of the Recipient's private key for decryption.

The cryptographic utility 24 then validates the Recipient's certificate, checks for expiration, checks for revocation, and also obtains key usage data to permit use of the Recipient's certificate to conduct a PKI process. The cryptographic utility 24 also validates the certificate of the Sender, and the integrity of the Sender's public key and appropriate usage of such public key to permit the PKI operations referenced below. All of this is provided in a manner that is known.

Cryptographic utility 24 then conducts a series of cryptographic operations which generally include decryption of data, and digital signature verification. It should be understood that in the present invention, cryptographic utility 24 is adapted to perform specific cryptographic operations in relation to specific batches of data included in the web page 18 marked for processing in the mark-up language included in the web page 18. In this manner, each specified data element could be decoded in PKCS#7 format, or using some other custom data format involving decryption and/or signature verification. Also, cryptographic utility 24 permits ciphertext in the web page 18 to be selectively decoded and displayed in clear text.

It should be understood that the data in relation to which the cryptographic operations referenced above are conducted may include all forms of data, including for example images such as gifs or jpgs. Therefore, another aspect of the present invention is, a system, computer product and method for decrypting and displaying images, including at a wireless device.

This permits fields with sensitive data, for example, to be retrieved on an encrypted and/or digitally signed basis, while other fields with less sensitive data may remain unencrypted and unsigned. This conserves bandwidth, as well as memory resources wherever the data included in the web form 26 may be received. This also encourages flexibility in data management procedures such that less sensitive data can be mined, while sensitive data is stored on a secure basis.

When considered together, FIGS. 3 to 6 illustrate that the basic architecture of the system of the present invention is designed to promote interoperability between wireless and web based wired devices. Therefore the present invention permits PKI enabled data to be transmitted and received from one wireless device to another, from a wireless device to a wired web device, and conversely from a wired web device to a wireless device.

Another aspect of the present invention is therefore a method for allocating data resources as between the web server and a wireless device such that PKI is provided on the wireless device. More specifically, the present invention permits user keys and certificates to be easily processed on a wireless device by means of a cryptographic utility that is loaded on the wireless device. The application of the present invention permits a wide range of cryptographic operations to be supported at wireless devices by means of a relatively small computer program. This permits rapid and inexpensive deployment of technology solutions that involve the use of PKI enabled data, including in relation to both wired and wireless networks.

The present invention also provides for persistent field level encryption on a selective basis throughout an Internet-based data process. This promotes efficient utilization of resources by invoking PKI operations in relation to specific elements of an Internet-based data process where security/authentication is most needed.

The present invention also provides a set of tools whereby PKI capability is added to a browser in an efficient manner.

The present invention also permits expansion of the use of web enabled applications, including at wireless devices, by providing means for client-side user authentication and cryptography. The present invention therefore provides means for PKI enablement of web applications.

The present invention should also be understood as a set of tools for complying with legal digital signature requirements, including in association with a wireless device. Specifically, the present invention allows a user to review and sign messages and transactions in a mini browser such that such messages or transactions will be legally binding.

The present invention also permits the design and implementation of Internet-based data processes whereby specific data can be sent to a remote database on an encrypted basis, and stored on an encrypted basis, including at field level.

A further aspect of the present invention is a solution to the "man in the middle" security hole of proxy based gateways between Internet and wireless networks.

A still other aspect of the present invention is a method for permitting applications to inter-operate between wireless and Internet based or other networks.

In addition to the preferred embodiment, other variations of the invention are possible, provided that data security and authentication are present.

In addition, a system, computer product and method-for decrypting and displaying encrypted images in a browser is provided.

We claim:

1. A method for providing public key infrastructure (PKI) enabled data communication in a browser, the method comprising:
    providing a PKI enabled browser at a network-connected client-side device of a user;
    providing a cryptographic utility at the user's network-connected client-side device, the cryptographic utility including at least a user private key, wherein a user public key and the user private key are a public/private key pair respective to the user operating the network-connected client-side device; and
    downloading a web page requested by the user to the PKI enabled browser that includes computer-readable instructions which, when executed, permit PKI data operations by the cryptographic utility at the network-connected client-side device of:
        verification of a digital signature associated with data included in the web page for the user using a sender's public key and decryption of the data on a field-selectable basis using the user private key; and
        encryption of data provided to the web page by the user on a field-selectable basis using a recipient's public key for subsequent decryption using the recipient's private key and signing the data to be communicated using the user private key.

2. The method of claim 1, whereby the data includes image data.

3. A method for posting data on a Public Key Infrastructure (PKI) enabled basis from a network-connected client-side device of a user to a recipient associated with a remote computer device, wherein the network-connected device of the user and the remote computer device are each connected to the Internet, the user's network-connected client-side device including a PKI enabled browser which permits PKI data operations at the network connected client-side device, the method comprising:
    the user requesting a web page from a remote computer device;
    downloading the web page to the PKI enabled browser at the user's network-connected client-side device, the web page including a web form that includes one or more fields;
    the user providing data to the one or more fields of the web form;
    accessing from a memory associated with the user's network-connected client-side device instructions for encrypting the data on a field-selectable basis using a recipient's public key for subsequent decryption using the recipient's private key and signing the data to be communicated using the user private key associated with the user;
    executing the instructions in relation to the data such that the data is PKI enabled; and transmitting the data on a PKI enabled basis to the remote computer device for posting to a database linked to the remote computer device.

4. A non-transitory computer readable medium useful in association with a client-side computer which includes a processor and a memory, the computer readable medium including computer instructions which are configured to cause the client-side computer to provide Public Key Infrastructure (PKI) enabled data communication by means of a browser loaded on the client-side computer, the computer readable medium comprising:
    a cryptographic facility functionally linked to the browser, the cryptographic facility being responsive to instructions corresponding to a web page downloaded to the browser to access from the memory instructions for:
    verification of a digital signature associated with data included in the web page for a user using a sender's public key and decryption of the data on a field-selectable basis using a user private key associated with a user operating the browser; and
    encryption of data provided to the web page by the user on a field-selectable basis using a recipient's public key for subsequent decryption using the recipient's private key and signing the data to be communicated using the user private key;
    whereby the cryptographic facility is engageable by the user to perform either instruction such that the browser conducts data communications in relation to the data with one or more remote computers on a PKI enabled basis.

5. A non-transitory computer readable medium useful in association with a web server which includes a processor and a database, the computer readable medium including computer instructions which are configured to cause the web server to facilitate Public Key Infrastructure (PKI) enabled data transactions in relation to one or more network-connected client-side devices of users each including a browser, the computer readable medium comprising:
- a web application adapted to generate a series of web pages including instructions adapted to engage a computer application linked to the browser to:
- verify a digital signature associated with data included in the web pages for users using a sender's public key and decryption of the data on a field-selectable basis using a user private key associated with a user operating the browser; and
- encrypt data provided to the web pages by users on a field-selectable basis using a recipient's public key for subsequent decryption using the recipient's private key and sign the data to be communicated using the user private key;
- a database; and
- a database management utility linked to the database, and responsive to the web application, whereby the web application is responsive to requests from the network connected 2client-side devices of users to:
- respond to requests from the network-connected client-side devices for specific web pages;
- facilitate the receipt of PKI enabled data from the network-connected client-side devices;
- store data, including PKI enabled data to the database; and
- retrieve data requested from the network-connected client-side devices from the database and send the data, including PKI enabled data, on a secure basis to the network-connected client-side devices.

6. A computer system for providing Public Key Infrastructure (PKI) enabled data communications at a network-connected client-side device of a user, the computer system comprising:
- a processor;
- a memory operatively connected to the processor;
- a browser loaded on the computer; and
- a cryptographic facility linked to the browser, the cryptographic facility being responsive to instructions corresponding to a web page downloaded to the browser, to access from the memory instructions for:
- verification of a digital signature associated with data included in the web page by the users using a sender's public key and decryption of the data on a field-selectable basis using a user private key associated with the user operating the browser; and
- encryption of data provided to the web page by the user on a field-selectable basis using a recipient's public key for subsequent decryption using the recipient's private key and signing the data to be communicated using the user private key;
- such that the browser conducts data communications in relation to the data with one or more remote computers on a PKI enabled basis.

7. A computer system comprising:
a web server connected to the Internet, the web server including a processor and a memory operatively connected to the processor;
- a web application loaded on the web server, the web application being adapted to generate a series of web pages including instructions adapted to:
- verification of a digital signature associated with data included in the web pages for users using a sender's public key and decryption of the data on a field-selectable basis using a user private key associated with a user operating a browser; and
- encryption of data provided to the web pages by users on a field-selectable basis using the a recipient's public key for subsequent decryption using the recipient's private key and signing the data to be communicated using the user private key;
- a database; and
- a database management utility linked to the database, and responsive to the web application, whereby the web application is responsive to requests from a network-connected client-side device of a user to:
- respond to requests from the user's network-connected client-side device for specific web pages;
- facilitate the receipt of Public Key Infrastructure (PKI) enabled data from the user's network-connected client-side device;
- store data, including PKI enabled data to the database; and
- retrieve data requested from the user's network-connected client-side device from the database and send the data, including PKI enabled data, on a secure basis to the user's network-connected client-side device.

8. A system for Public Key Infrastructure (PKI) enabled data transactions using a browser, the system comprising:
- one or more network-connected client-side devices each including a PKI enabled browser;
- a web server connected to the Internet, the web server including a processor and a memory operatively connected to the processor;
- a web application loaded on the web server, the web application being adapted to generate a series of web pages including instructions adapted to engage the PKI enabled browser to:
- verify a digital signature associated with data included in the web pages for users using a sender's public key and decrypt the data on a field-selectable basis using a user private key associated with the user operating the browser; and
- encrypt data provided to the web pages by users on a field-selectable basis using a recipient's public key for subsequent decryption using the recipient's private key and sign the data to be communicated using the user private key;
- a database loaded on the web server and linked to the web application;
a database management utility connected to the database, and responsive to the web application, whereby the web application is responsive to requests from the PKI enabled browsers of the network-connected client-side devices to:
- respond to requests from the network-connected client-side devices for specific web pages;
- facilitate the receipt of PKI enabled data from the network-connected client-side devices;
- store data, including PKI enabled data to the database; and
- retrieve data requested from the network-connected client-side devices from the database and send the data, including PKI enabled data, on a secure basis to the network-connected client-side devices, whereby the PKI enabled browsers and web server cooperate to provide persistent PKI enabled data transactions between the network-connected client-side devices, and the network-connected client-side devices and the web server.

9. A method for providing Public Key Infrastructure (PKI) enabled data communication in a browser, the method comprising:
- providing a PKI enabled browser at a network-connected client-side device of a user;
- providing a cryptographic utility at the user's network-connected client-side device, the cryptographic utility including a locally available user public key and a locally available user private key, wherein a user public key and the locally available user private key are a public/private key pair associated with the user operating the network-connected client-side device; and downloading a web page to the PKI enabled browser that includes computer instructions which, when executed, permit PKI data operations of:

verification of a digital signature associated with data included in the web page for the user using a sender's public key and decryption of the data on a field-selectable basis using the locally available user private key; and encryption of data provided to the web page by the user on a field-selectable basis using a recipient's public key for subsequent decryption using the recipient's private key and signing the data to be communicated using the locally available user private key.

10. A non-transitory computer readable medium useful in association with a client-side computer which includes a processor and a memory, the computer readable medium including computer instructions which are configured to cause the client-side computer to provide Public Key Infrastructure (PKI) enabled data communication by means of a browser loaded on the client-side computer, the computer readable medium comprising: a cryptographic facility functionally linked to the browser, the cryptographic facility being responsive to instructions for:

verification of a digital signature associated with data included in a web page for a user using a sender's public key and decryption of the data on a field-selectable basis using a locally available user private key associated with the user operating a network-connected client-side device; and encryption of data provided to the web page by the user on a field-selectable basis using a recipient's public key for subsequent decryption using the recipient's private key and signing the data to be communicated using the locally available user private key;

such that the browser conducts data communications in relation to the data with one or more remote computers on a PKI enabled basis.

11. A computer system comprising:
a web server connected to the Internet, the web server including a processor and a memory operatively connected to the processor;
a web application loaded on the web server, the web application being adapted to generate a series of web pages including instructions adapted to:
verify a digital signature associated with data included in the web pages for users using a sender's public key and decrypt the data on a field-selectable basis using a locally available user private key associated with a user operating a network-connected client-side device; and
encrypt data provided to the web pages by users on a field-selectable basis using a recipient's public key for subsequent decryption using the recipient's private key and sign the data to be communicated using the locally available user private key;
a database; and
a database management utility linked to the database, and responsive to the web application, whereby the web application is responsive to requests from the network-connected client-side device, including,
responding to requests from the network-connected client-side device for specific web pages;
facilitating the receipt of Public Key Infrastructure (PKI) enabled data from the network-connected client-side device;
storing data, including PKI enabled data to the database; and
retrieving data requested from the network-connected client-side device from the database and sending the data, including PKI enabled data, on a secure basis to the network-connected client-side device.

12. A computer system comprising:
a client-side computer comprising a processor and a memory;
a browser running on the computer, the browser configured for a user to download a web page from a remote computer, said web page including one or more encrypted fields;
a cryptographic utility running on the computer, the cryptographic utility configured to:
verify a digital signature associated with data included in the web page for the user using a sender's public key and decrypt the data on a field-selectable basis using a user private key associated with the user operating the browser; and
encrypt data provided to the web page by the user on a field-selectable basis using a recipient's public key for subsequent decryption using the recipient's private key and sign the data to be communicated using the user private key.

13. The computer system as claimed in claim 12, wherein said browser comprises a Public Key Infrastructure (PKI) enabled browser which permits PKI data operations.

14. A method for receiving a web page having one or more encrypted fields at a Public Key Infrastructure (PKI) enabled browser running on a client-side computer operated by a user, said method comprising the steps of:
downloading the web page to the PKI enabled browser which permits PKI data operations; and performing:
verification of a digital signature associated with data included in the web page for the user using a sender's public key and decryption of the data on a field-selectable basis using a user private key associated with the user operating the browser and being stored locally; and
encryption of data provided to the web page by the user on a field-selectable basis using a recipient's public key for subsequent decryption by the recipient of the data using the recipient's private key and signing the data to be communicated using the user private key.

15. A computer system for providing Public Key Infrastructure (PKI) enabled data communications at a network-connected client-side wireless device of a user, the computer system comprising:
a processor;
a memory operatively connected to the processor;
a browser loaded on the network-connected client-side wireless device; and
a cryptographic facility linked to the browser, the cryptographic facility being responsive to instructions corresponding to a web page downloaded to the browser, to access from the memory instructions for:
verification of a digital signature associated with data included in the web page for the user using a sender's public key and decryption of the data on a field-selectable basis using a user private key associated with a user operating the browser; and
encryption of data provided to the web page by the user on a field-selectable basis using a recipient's public key for subsequent decryption of the data using the recipient's private key and signing the data to be communicated using the user private key;

such that the browser conducts data communications in relation to the data with one or more remote computers on a PKI enabled basis.

* * * * *